H. E. MYERS.
EYE TESTER.
APPLICATION FILED FEB. 14, 1920.

1,349,625.

Patented Aug. 17, 1920.
2 SHEETS—SHEET 1.

Inventor
H. E. Myers

By [signature]

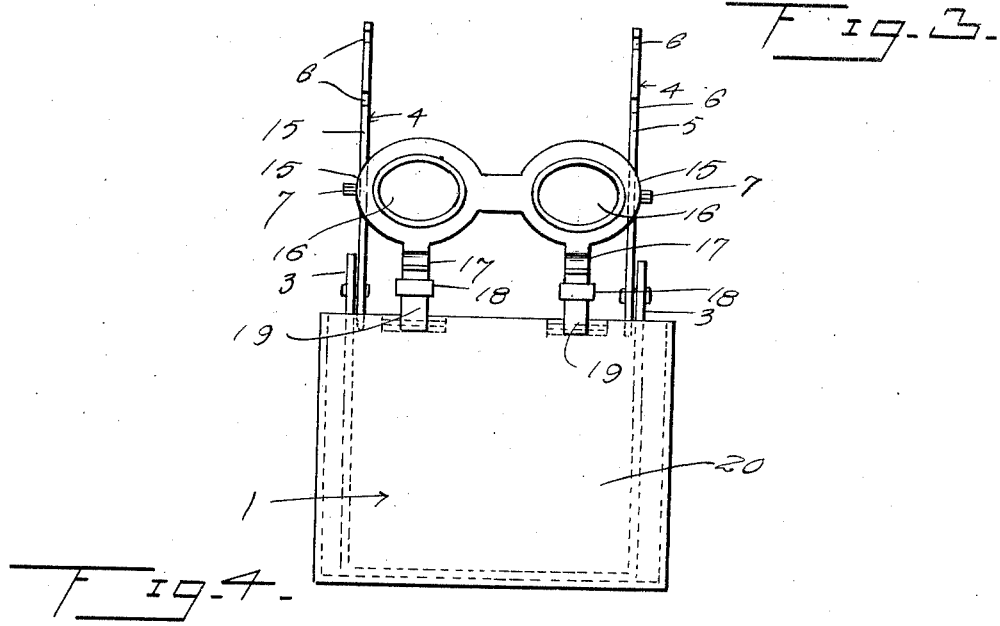
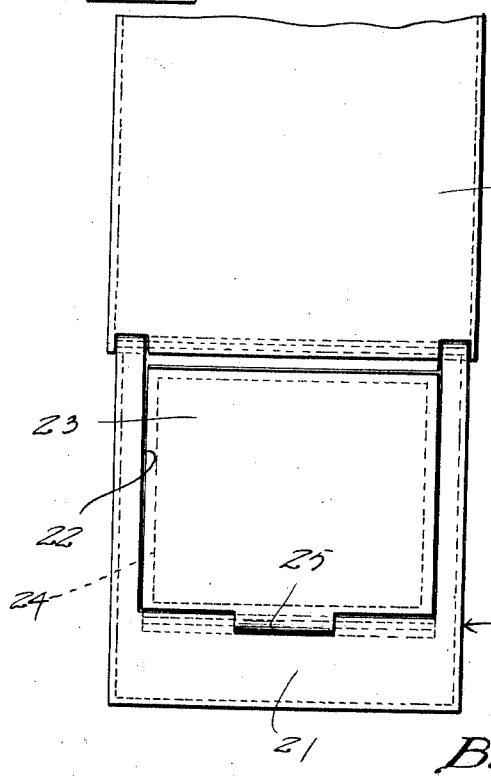
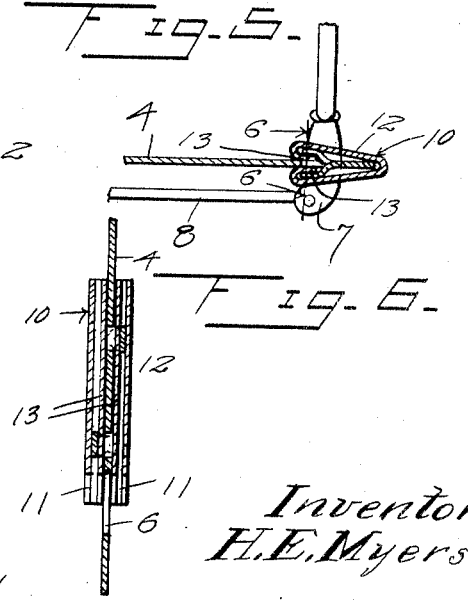

UNITED STATES PATENT OFFICE.

HENRY E. MYERS, OF BOWMAN, NORTH DAKOTA.

EYE-TESTER.

1,349,625. Specification of Letters Patent. Patented Aug. 17, 1920.

Application filed February 14, 1920. Serial No. 358,627.

*To all whom it may concern:*

Be it known that I, HENRY E. MYERS, a citizen of the United States, residing at Bowman, in the county of Bowman and State of North Dakota, have invented certain new and useful Improvements in Eye-Testers; and I do hereby declare the following to be a full, clear, and exact description of the invention, such as will enable others skilled in the art to which it appertains to make and use the same.

This invention relates to new and useful improvements in eye testers and more particularly to a device for holding a plurality of eyeglasses with different lenses and has for its primary object the provision of means, whereby any one of the glasses can be brought in front of a person's eyes and between the same and a reading chart so as to determine if the lenses thereof are suitable or correct for the eyes of the person.

Another object of this invention is the provision of means whereby the various parts of the device can be folded into a compact device when not in use so that the same can be conveniently carried or stored in a comparatively small space.

A further object of this invention is the provision of an eye tester of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description, and accompanying drawings, in which:—

Figure 1:
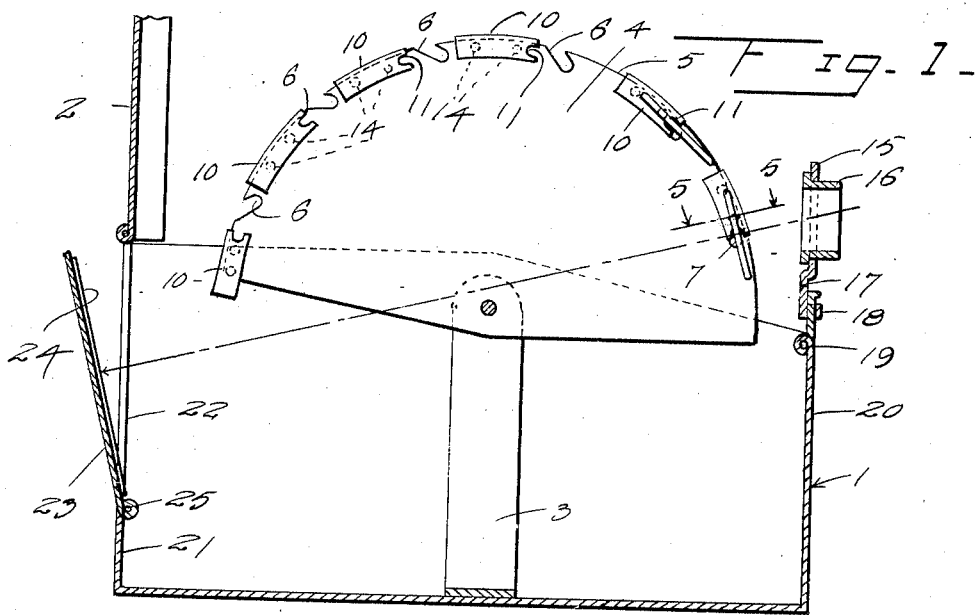
Figure 2:
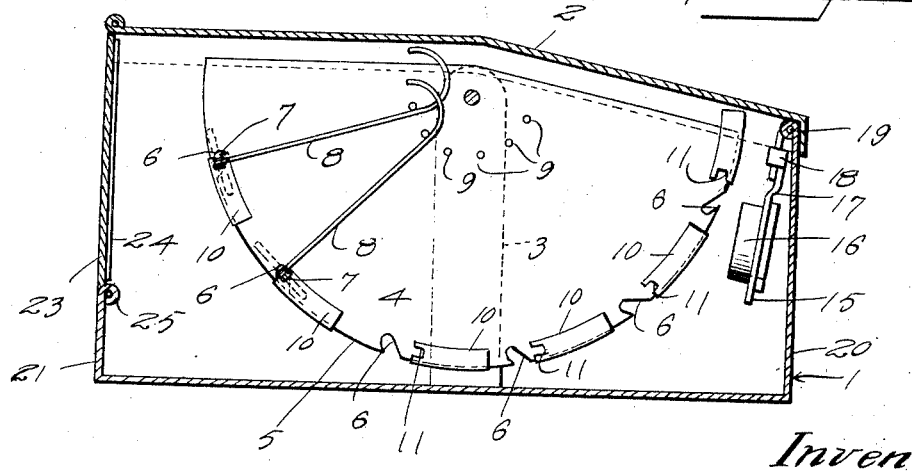

Figure 1 is a vertical sectional view illustrating an eye tester constructed in accordance with my invention and positioned for operation, Fig. 2 is a similar view illustrating the device collapsed or folded, Fig. 3 is a front elevation illustrating the eye shields or guards, Fig. 4 is a fragmentary rear elevation illustrating the reading chart, Fig. 5 is a detail sectional view taken on the line 5—5 of Fig. 1, Fig. 6 is a similar view taken on the line 6—6 of Fig. 5.

Referring in detail to the drawing, the numeral 1 indicates a casing which has its upper end open and is adapted to be closed by a hinged cover 2. A support 3 is located in the casing 1 and includes vertical arms to which are pivotally connected segmental shaped supporting plates 4. The pivotal connections between the plates 4 and the bracket 3 are of the frictional type so that said plates 4 will maintain any position that they may be moved into. The curved edges 5 of the plates 4 are provided with spaced notches 6 to receive the ends of eyeglass or spectacle frames 7. If spectacles are supported in the notches 6 the temple bars 8 thereof are placed over or in engagement with pins 9 carried by said plates.

Locking elements 10 are slidable on the curved edges 5 of the plates 4 between the notches 6 and each locking element has a notch 11 in one end adapted to receive the ends 7 of the eyeglass or spectacle frames when said locking elements 10 are slid over the notches 6. The notches 11 coöperate with the notches 6 in securing the eyeglasses or spectacles to the supporting plates 4 and the notches 11 permit the locking elements 10 to close the notches 6 preventing the eyeglass or spectacle frames from escaping from the notches 6.

The locking elements 10 are preferably constructed from sheet metal which is bent upon itself to form a substantially V-shaped body 12 that has its ends bent inwardly upon itself to form gripping portions 13 that engage each face of the supporting plates 4. The supporting plates 4 between the notches 6 are provided with struck-out tongues 14 that form tension means between the locking elements 10 and said plates and are adapted to prevent accidental movement of the locking elements on said supporting plates.

An eye guard or shield 15 is provided with openings 16 to register with the eyes of a person and said guard or shield has formed thereon stems or legs 17 provided with frictional clamps 18 for adjustably securing said stems or legs to arms 19 hinged to the upper edge of the front wall 20 of the casing 1, providing a construction wherein the guard or shield can be swung inwardly of the casing when not desiring to use the device and can be swung to a substantially vertical position when desiring to employ the device for testing a person's eyes.

The rear wall 21 of the casing 1 is provided with an opening 22 which is adapted to be closed by a support 23 and which has mounted thereon a reading chart 24. The support 23 is hinged to the rear wall 21 as illustrated at 25 and said hinge is of such a construction that it will only permit the support 23 to be swung outwardly of the casing until it assumes an inclined position which permits light to readily play upon the reading chart, so that the characters thereof are plainly brought out.

In operation, eyeglasses or spectacles having different lenses are arranged about the curved edges of the supporting plates 4 and the chart is moved into a reading position and with the shields or guards in a vertical position outwardly of the casing, the eyeglasses or spectacles are then successively brought between the guards or shields and the chart so that a person looking through the guards or shields will also look through the lenses of the spectacles or eyeglasses when reading the chart thereby permitting an optician or a person skilled in the art of fitting glasses to a person to readily bring different lenses in the path of the eye sight by simply moving the supporting plates 4.

When not desiring to use the device, the segmental supporting plates 4 are swung downwardly within the casing 1 and also the eye guards or shields and the support 23 is moved to close the opening 22 in the rear wall and the cover 2 swung downwardly into engagement with the casing 1 thereby providing a very compact and convenient device which can be easily carried or stored in a considerably smaller space.

While I have shown and described the preferred embodiment of my invention, it will be understood that minor changes in construction, combination, and arrangement of parts may be made without departing from the spirit and scope of the invention as claimed.

Having thus described my invention, what I claim is:—

1. An eye tester comprising a support, plates pivoted to said support and having notches to receive eyeglasses, means locking the eyeglasses into certain notches, and a reading chart carried by the support and associated with the eyeglasses.

2. An eye tester comprising a support, plates adjustable on said support and having notches to receive eyeglasses, means locking the eyeglasses in said notches, and a reading chart carried by the support.

3. An eye tester including a support, plates carried by said support and having notches therein to receive eyeglass frames, and locking elements slidable on said plates for closing the notches.

4. An eye tester including a support, plates carried by said supports and having notches to receive eyeglass frames, sleeves slidable on said plates for closing the notches and having notches therein to coöperate with the first named notches in receiving the eyeglass frames, and means holding the sleeves against accidental movement.

5. An eye tester including a support, plates carried by said support and having notches to receive eyeglass frames, sleeves having notches slidable on said plates for closing the first named notches, and tension tongues on said plates for engagement with the sleeves.

In testimony whereof I affix my signature in presence of two witnesses.

HENRY E. MYERS.

Witnesses:
 I. M. STUTLIEN,
 S. T. DOLVIN.